United States Patent
Bleumer

(10) Patent No.: US 8,205,088 B2
(45) Date of Patent: Jun. 19, 2012

(54) METHOD FOR THE AUTHENTICATED TRANSMISSION OF A PERSONALIZED DATA SET OR PROGRAM TO A HARDWARE SECURITY MODULE IN PARTICULAR OF A FRANKING MACHINE

(75) Inventor: Gerrit Bleumer, Schildow (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 1153 days.

(21) Appl. No.: 12/034,768

(22) Filed: Feb. 21, 2008

(65) Prior Publication Data

US 2008/0271144 A1 Oct. 30, 2008

(30) Foreign Application Priority Data

Mar. 6, 2007 (DE) .......................... 10 2007 011 309

(51) Int. Cl.
*H04L 9/32* (2006.01)
*H04L 9/00* (2006.01)
*G06F 21/00* (2006.01)

(52) U.S. Cl. .......... 713/176; 713/168; 713/170; 705/50; 705/60; 380/259; 380/260; 380/277

(58) Field of Classification Search .................. 713/168, 713/170, 176; 705/50, 60; 380/259, 260, 380/277
See application file for complete search history.

(56) References Cited

U.S. PATENT DOCUMENTS

| | | | |
|---|---|---|---|
| 6,362,724 B1 | 3/2002 | Rosenau | |
| 6,625,741 B1 | 9/2003 | Post et al. | |
| 6,771,179 B1 | 8/2004 | Post et al. | |
| 6,850,912 B2 * | 2/2005 | Bleumer | 705/51 |
| 6,952,777 B1 | 10/2005 | Post et al. | |
| 7,047,221 B1 * | 5/2006 | Hetzer et al. | 705/50 |
| 7,194,443 B1 | 3/2007 | Post et al. | |
| 7,222,238 B2 * | 5/2007 | Bleumer et al. | 713/177 |
| 7,437,756 B2 * | 10/2008 | Bleumer | 726/6 |
| 7,461,249 B1 * | 12/2008 | Pearson et al. | 713/156 |
| 7,610,247 B2 * | 10/2009 | Bleumer | 705/60 |
| 7,724,905 B2 * | 5/2010 | Bleumer et al. | 380/277 |
| 7,778,924 B1 * | 8/2010 | Ananda | 705/50 |
| 2002/0073349 A1 | 6/2002 | Turner et al. | |
| 2003/0028775 A1 * | 2/2003 | Bleumer et al. | 713/176 |
| 2005/0226422 A1 * | 10/2005 | Meyer et al. | 380/277 |
| 2007/0156605 A1 * | 7/2007 | Bleumer et al. | 705/64 |
| 2008/0114982 A1 * | 5/2008 | Bleumer et al. | 713/171 |
| 2009/0012915 A1 * | 1/2009 | Meyer et al. | 705/402 |

FOREIGN PATENT DOCUMENTS

| | | |
|---|---|---|
| DE | 198 16 571 | 10/1999 |
| DE | 198 16 572 | 10/1999 |
| DE | 102 18 835 | 11/2003 |

\* cited by examiner

*Primary Examiner* — Saleh Najjar
*Assistant Examiner* — Tae Kim
(74) *Attorney, Agent, or Firm* — Schiff Hardin LLP

(57) ABSTRACT

In a method and arrangement for authenticated transmission of a personalized data set or program to a hardware security module in a device such as a franking machine, a system manufacturer buys security modules, from a security module manufacturer and incorporate the security modules at a production site in the device and loads a data set and/or an application program into the security module, making the device operable. Authentication occurs using a first security module-specific fixed code, a second security module-specific fixed code that is calculated from the first code according to a given algorithm, and a third security module-specific fixed code that is calculated from the second code and the data in the data set and/or in the program.

21 Claims, 3 Drawing Sheets

Continuation in Fig. 2b

METHOD FOR THE AUTHENTICATED TRANSMISSION OF A PERSONALIZED DATA SET OR PROGRAM TO A HARDWARE SECURITY MODULE IN PARTICULAR OF A FRANKING MACHINE

BACKGROUND OF THE INVENTION

1. Field of the Invention

The present invention relates to a method for the authenticated transmission of a data set and/or of a program from a host to a hardware security module, ($HSM_i$), a system for implementing such a method, and a delivery package for carrying-out such a method.

2. Description of the Prior Art

In the sales and application channels of hardware security modules (HSM) there is typically made a differentiation between the HSM manufacturer, the system manufacturer, who integrates the HSMs in his system products, and the end user of these system products. A typical example of such a system product is a franking machine.

In doing so, the sales channel has to be protected such that system products with false HSMs or with HSMs, which comprise non-authorized software, cannot be made available to end users, for example by unauthorized third parties.

For this purpose, it is known for an HSM manufacturer to individualize an HSM after the manufacture thereof, for example by irreversibly implanting a unique or one-to-one serial number or the like, i.e. store in an HSM memory. Irreversible means herein that later neither a deletion nor a modification is possible. In most cases, further a cryptographic key is established in every HSM. After the electronic circuitries of the HSM have undergone and passed all hardware and software tests, the HSM with the electronic circuitries is sealed by producing or, if already present, activating its manipulation protection. Besides potting, various measures for this purpose are known in the art, and exemplarily only reference is made to documents DE 198 16 572 A1, DE 198 16 571 A1, EP 1 035 516 A2, EP 1 035 517 A2, EP 1 035, 518 A2, EP 1 035 513 A2 and DE 200 20 635 U1.

Then in a pre-personalization phase a code-verifying key is imported into the HSM, by means of which the HSM can later verify, whether or not a loaded application program is authorized. Provided with this code-verifying key an HSM is supplied to the system product manufacturer. On a separate way the system product manufacturer obtains a code-signing key, by means of which he is able to sign application programs. Code-verifying key and code-signing key are a key pair with a one-to-one relationship and are typically produced in an external host system of the HSM manufacturer, which then transmits the code-verifying key via an authenticated communication channel into the HSM. The authentication of the communication channels is normally made by rigorous access controls to the production and pre-personalization process, and supervision of incoming and outgoing material flows and employees by means of the four eyes principle, etc.

In the personalization phase, an application program can be loaded into the HSM, which is then later used in an operative phase (at the end user). In order to prevent that during the personalization phase non-authorized application programs are loaded into the HSM, the HSM requires a digital signature for every application program. This digital signature is verified after loading the application program with the code-verifying key, and with a positive verification the application program is accepted and persistently stored. In case of a negative verification a deletion of the newly loaded application program is carried out.

The personalization phase can be split up, so that the personalization process is started with the manufacture of the system products (pre-initialization) and terminated in the respective sales center of a target market (initialization). During the pre-initialization an import of an authenticated boot loader, registration of the HSM in a PKI of the system product manufacturer and loading of the application program for the end user take place. The initialization is then made by establishing and exchanging cryptographic keys for the end user. With regard to the technology of authenticated of boot loaders, reference is for example made to the document DE 101 37 505 B4.

Since the code-verifying key is the "public" portion of an asymmetric key pair (private/public key), it can be imported into all HSMs of a production, without a risk for the security of the respective (secret or to be kept secret) code-signing key.

HSMs are also known that operate with a secure communication interface to the host system on the base of symmetric encryption systems. The host system is enabled to initialize a so-called session with the HSM and to then transmit data sets and/or programs into the HSM, and that encrypted by means of a session key. For this purpose, a system manufacturer obtains the cryptographic session keys on a separate way from the HSM manufacturer. The session key must however be kept at the production site, and that in a secure environment, for example in an HSM integrated in the host and having a secure host processor and a secure host memory. This is of course required separately for every production site, which is expensive in setting-up and maintaining.

Therefore all above variants have the common drawback that at a production site of a system manufacturer high security measures are necessary, in order to prevent fraudulent use of codes and/or data sets and/or application programs. The device and the maintenance of such high security measures is expensive, time-consuming and prone to malfunctions.

SUMMARY OF THE INVENTION

An object of the invention is to provide a method and a system for the authenticated transmission of a data set and/or of a program from a host to an HSM at a production site, which can be implemented in an unprotected or only poorly protected environment and which secures nevertheless a high security against loading of unauthorized data sets and/or programs into the HSM to be produced or completed.

A data set encompasses a sequence of characters coding information. The sequence of characters may consist of numbers or be alphanumeric.

A program is composed of program lines comprising program instructions. The program instructions effect in a processor, on which the program runs, the execution of mathematical operations and if applicable the output of data sets as results of the mathematical operations.

In most cases programs also include data sets, which are required for the execution of the mathematical operations and which are invariant. Variant data sets, which are required for the mathematical operations, are typically entered via an interface.

A host is a central computer, to which different HSMs can be connected simultaneously or successively, and from which data sets and/or programs are transmitted via an interface to every HSM according to the host program.

An HSM is a hardware security module, which typically includes an electronic circuitry, at least one interface and mechanical, electrical and/or electronic protections against an unauthorized access. The electronic circuitry usually includes an HSM processor, an HSM memory and control outputs, which are driven according to an application program processed in the control processor. The HSM memory often is composed of different memory units or memory sections, wherein programs, data sets, intermediate program results etc. are stored.

A variable code is a sequence of characters, which varies with every generation of the variable code, i.e. successive variable codes have different sequences of characters. Typical examples for variable codes are time codes, in the simplest case a sequence of characters increased by a given n-fold (n=positive natural number) of a processor cycle each by a character unit, random sequences of characters (can for example be generated in the HSM processor with a program for calculating random numbers), or linear or non-linear sequences of characters calculated according to given algorithms. A variable code may be composed partially of a fixed code, i.e. a portion of the sequence of characters does not vary, whereas another portion of the sequence of characters is modified with every generation.

A fixed code is a sequence of characters, which is invariant, i.e. remains identical with every readout from a memory.

An individual code is a code, which is assigned in a one-to-one relationship to a device, for example to an HSM, to a program or to a data set. Different devices, programs or data sets, even with identical contents or structure, have different assigned individual codes. An individual code is so to speak a unique name for a device, program, or data set. Essential is the respective assignment. Examples for individual fixed codes include serial numbers, sequence numbers, etc.

An algorithm is a program code, which codes a defined calculation rule.

An HSM manufacturer manufactures the HSM as an independent structural unit and sells such HSMs to system manufacturers.

A system manufacturer buys HSMs from an HSM manufacturer, incorporates them at a production site in a system device and loads a data set and/or an application program (if applicable also several data sets and/or application programs) into the HSM, whereby the system device becomes operable, for example as a franking machine. The system manufacturer's site and the production site are normally not the same, they may even be in different countries. Normally, to a system manufacturer's site are even assigned several different production sites. At the system manufacturer's site are made (in addition to logistic planning and shipment of the HSMs to the different production sites) the generation, administration and shipment of keys or codes and/or of data sets or application programs to one or several production sites.

An interface permits the exchange of data and/or programs between two processors or processor systems. Every device with a processor system, into which data and/or programs can be loaded, has an interface. An interface connects a device internal BUS with a device external transmission medium. As transmission media can be used cables, wire or glass fiber-bound, and wireless transmissions, such as by means of radio waves or IR.

Transformation of a code en compasses a conversion of the sequence of characters of the code into a different sequence of characters according to a given algorithm. A reverse transformation converts the sequence of characters of the transformed code back into the sequence of characters of the original code, this is thus a symmetric algorithm reverse or inverse to the algorithm used for the transformation.

A hardware configuration parameter $HWP_i$ is a code, which is individual for an $HSM_i$, and which serves for identifying the HSM type, to which the $HSM_i$ belongs, for example by stating the memory size, security degree, etc.

An authentication key $Authkey_i$ is a code, which is individual for the $HSM_i$, and which serves for the encryption of a variable code or for the decryption of an encrypted variable code.

A transport key $TK_i$ is a code, which is individual for an $HSM_i$, and which serves for making available a secret code for a communication of an $HSM_i$ during a personalization, and that for obtaining a session key.

A $MAC_i$ is a message authentication code being individual for an $HSM_i$, which for example is formed by the data of the data set and/or of the application program.

An additional fixed code portion is a fixed code, which may be individual or not for an $HSM_i$, and is different from the above fixed codes.

A boot loader program is a boot program, such as described for example in the document DE 101 37 505 B4.

An application program is a program, which controls and/or protocols in a device, in which the HSM is integrated, processes with usual software techniques, such as for example a franking process, if applicable according to acceptable user entries.

A key code is an arbitrary code, which serves for the encryption and/or decryption. This may for example be a public key, e.g. with a PKI certificate of the host system.

The term franking machine generally is a device, by which franking of mailpieces, such as letters, small parcels, big parcels, and other containers for delivery, can be done. These are thus also mail processing machines and computers with mail processing functions, for example franking by PC.

A delivery package is a device with assigned data sets, codes, or programs. Data sets, codes and/or programs may be stored on one or on different data carriers, such as optical or magnetic data carriers, chip cards or the like. The term storage on a data carrier also comprises the recording on a paper substrate or the like. The device and the data carrier or data carriers may be combined to a package unit or be provided and delivered in separate package units. In lieu of a delivery of a data carrier, a transmission by remote data transmission, for example through the internet, is also possible, then an information unit replaces the data carrier.

The aforementioned object, is achieved in accordance with the invention by a method for the authenticated transmission of a data set and/or of a program from a host to a hardware security module$_i$ (HSMi) comprising the following steps:

a) at a system manufacturer's site, for i $HSM_i$, each having an HSM processor, a code generator that generates a variable code Cw and an HSM memory connected with the HSM processor, a first HSM individual fixed code $Fc1_i$, a second HSM individual fixed code $Fc2_i$, and a third HSM individual fixed code $Fc3_i$ are determined,
the second fixed code $Fc2_i$ is calculated from the first fixed code $Fc1_i$ according to a given algorithm,
the third fixed code $Fc3_i$ is calculated from the second fixed code $Fc2_i$ and data of the data set and/or of the program, and all the fixed codes $Fc1_i$, $Fc2_i$ and $Fc3_i$ optionally are different from each other, b) at the system manufacturer's site, the first fixed code $Fc1_i$ and the second fixed code $Fc2_i$ or the given algorithm are stored in the HSM memory, c) at least one of the HSM is transported to a production site, and the first fixed code $Fc1_i$, optionally the data set and/or the program, and the third fixed code $Fc3_i$ are transmitted to the production site and stored in the host with host processor and host memory, d) at the production site, the HSM processor and the host processor are connected with each other by at least one interface, e) the host processor transmits to the $HSM_i$ an initialization data sequence, by means of which a response data sequence, optionally including an identification of the $HSM_i$, is requested, f) after reception of the response data sequence and optionally successful identification of the $HSM_i$, the host processor couples the data set and/or the program to be transmitted with the third fixed code $Fc3_i$ assigned to the $HSM_i$ and stored to a transmission data set and transmits the transmission data set to the HSM processor, g1) the HSM processor calculates, using the stored given algorithm, the second fixed code $Fc2_i$ or reads it out from the HSM memory (5) and compares it with a second fixed code $Fc2_i'$ calculated from the transmission data set, or g2) the HSM processor calculates, using the stored given algorithm, the second fixed code $Fc2_i$ and therefrom in connection with the transmission data set or the transmitted data set and/or program the third fixed code $Fc3_i$ and compares it with the third fixed code $Fc3_i'$ comprised in the transmission data set, and h) in case of agreement of the second fixed code $Fc2_i$ with the second fixed code $Fc2_i'$ or of the third fixed code $Fc3_i$ with the third fixed code $Fc3_i'$, the authorization and approval of the data set and/or of the program for the activation in the $HSM_i$ are effected.

Optionally, the following steps may immediately follow step e):

e1) the $HSM_i$ generates with the means for the generation (4) of a variable code a variable code Cw, stores this variable code Cw in the HSM processor and transmits this variable code Cw via the interface to the host processor, e2) the host processor transforms the received variable code Cw by means of the first fixed code $Fc1_i$ stored and assigned to the $HSM_i$ into a transformed variable code Cwt and transmits the transformed variable code Cwt to the HSM processor, and e3) the HSM processor carries out with the received transformed variable code Cwt with the first fixed code $Fc1_i$ a symmetric transformation being reverse to the transformation of the step e2) and compares the obtained back-transformed variable code $Cw_{rt}$ with the variable code Cw stored in step e1) and transmits in case of agreement a confirmation data sequence to the host processor.

It is achieved by the invention that at a production site there are not required any special security measures for the provision of the first fixed code $Fc1_i$ and of the third fixed code $Fc3_i$ and the transmission thereof to the $HSM_i$. On the other hand, nevertheless, there is a high security against the loading of unauthorized data sets and/or program, since without knowledge of the algorithms for the calculation of the second fixed code $Fc2_i$ from the first fixed code $Fc1_i$, and for the calculation of the third fixed code $Fc3_i$ from the second fixed code $Fc2_i$ it is not possible to generate a third fixed code $Fc3_i$ and combine it with an (unauthorized) data set or program, which would be detected by the $HSM_i$ as valid. These algorithms are not freely accessible at the production site, but are only stored in the $HSM_i$. As a result, the first fixed code $Fc1_i$ and the third fixed code $Fc3_i$ can be provided without security measures at the production site, and nevertheless unauthorized data sets or programs cannot successfully be loaded into an HSM. A considerable simplification at the production site is achieved, and the necessary security against loading unauthorized data sets and programs is maintained.

In case of a negative comparison in one of the steps e3) or g1) or g2), resp., an abortion of the process is effected. In case of a negative comparison in step e3), there is therefore no transmission of the transmission data set. In case of a negative comparison in step g1) or g2), resp., a deletion of the transmitted data set or program from the HSM memory is effected.

Basically, the steps e1) to e3) represent a sequence "Hello Request, Hello Reply (with encrypted variable code Cw), Challenge Request, Challenge Reply" as known from the network technology. An authorization of the host with regard to the $HSM_i$ takes place. For the purpose of the invention it is possible that the host also transmits a (if applicable different) to the $HSM_i$, whereupon the $HSM_i$ encrypts the received variable code by means of the first fixed code $Fc1_i$ and transmits it back to the host, which then performs a back-transformation by means of the fixed code $Fc1_i$ and compares the result with the stored variable code. This additional authorization may for example be made between the steps e3) and f).

The data set transmitted to the $HSM_i$ may for example be a key code. The program transmitted to the $HSM_i$ may be a boot loader program or an application program.

The fixed codes used according to the invention may in principle be of any kind. In the practice it is preferred that the first fixed code $Fc1_i$ is an authentication key $Authkey_i$, and that i is a serial number of the $HSM_i$ or an individual data set correlated therewith. The second fixed code $Fc2_i$ can be calculated from a serial number$_i$ or i itself, a hardware configuration parameter $HWP_i$, $Authkey_i$, a transport key $TK_i$ and optionally an additional fixed code portion with a defined algorithm and thus form a session key$_i$:

Session key$_i$ =f (serial number$_i$, $HWP_i$, $Authkey_i$, $TK_i$, fixed code portion$_i$), wherein i is a positive natural number. The system manufacturer obtains the respective keys from the HSM manufacturer, and there the calculations are carried out, as described above.

Before the method according to the invention is carried out, the production of the $HSM_i$ and its delivery to the system manufacturer together with the generated and assigned codes takes place. For this purpose, before the step a) at least one $HSM_i$ is produced by the HSM manufacturer, and by the HSM manufacturer at least i and the first fixed code $Fc1_i$ is assigned to the $HSM_i$. The $HSM_i$ together with the information on i and $Fc1_i$ is then delivered to the system manufacturer. At the HSM manufacturer, the assignment of the third fixed codes $Fc3_i$ and its delivery can also be made, this is however not necessarily required. In any case, however, at the HSM manufacturer, the algorithms and codes necessary for the method according to the invention are loaded into the $HSM_i$. In detail the HSM manufacturer may also store $HWP_i$ in the $HSM_i$ and transmit $Authkey_i$ and $TK_i$ to the system manufacturer.

The host may in principle be arranged in an arbitrary manner, since a secure transmission cable to the HSM is not required. Thus, the host may be provided at the HSM manufacturer or at the system manufacturer. Normally, however, it is preferred that the host is provided at the production site.

Typically the data set and/or the program are transmitted from an application server to the host before the step i).

In view of the advantages according to the invention, as described above, the host can also be operated as a stand-alone host and needs not have any security functionality. For example, secured transmission cables and/or host-own HSMs are therefore not required.

The invention also relates to a system that implements the method described above. The above explanations with regard to the method, including the preferred embodiments apply in an analogous manner to the system according to the invention. The invention also relates to a processing assembly that implements the method described above.

For the invention it is preferred that the $HSM_i$ is intended for the integration in a franking machine or forms a portion of a franking machine.

DESCRIPTION OF THE PREFERRED EMBODIMENTS

Example 1

Production of an HSM and Delivery to a System Manufacturer

An HSM manufacturer produces the hardware for the HSM her and stores the software therein. To every $HSM_i$ is assigned a serial $number_i$, an $HWP_i$, an $Authkey_i$ and a $TK_i$. The serial $number_i$ and the $HWP_i$ are stored in the respective $HSM_i$.

The $HSM_i$ thus produced is supplied to the system manufacturer and the $Authkey_i$ and $TK_i$ assigned to the $HSM_i$ are transmitted to the system manufacturer together with the assignment.

Example 2

Production Preparations of the System Manufacturer and Deliveries to a Production Site At the system manufacturer, for every $HSM_i$ a session $key_i$ is calculated according to the formula Session $key_i$=f(serial $number_i$, $HWP_i$, $Authkey_i$, $TK_i$, fixed code $portion_i$), and stored either in the HSM memory, or the given algorithm for this is stored in the $HSM_i$.

By means of the session $key_i$ and using data from a data set or program to be installed at the production site then an $MAC_i$ respectively is calculated.

Finally the $HSM_i$, $Authkey_i$, and if applicable the data set or the program, if not yet existing at the production site, are transmitted to the production site, and that under respective assignment for example based on i or a serial $number_i$.

Example 3

Representation of the Components of a System According to the Invention

Figure 1:
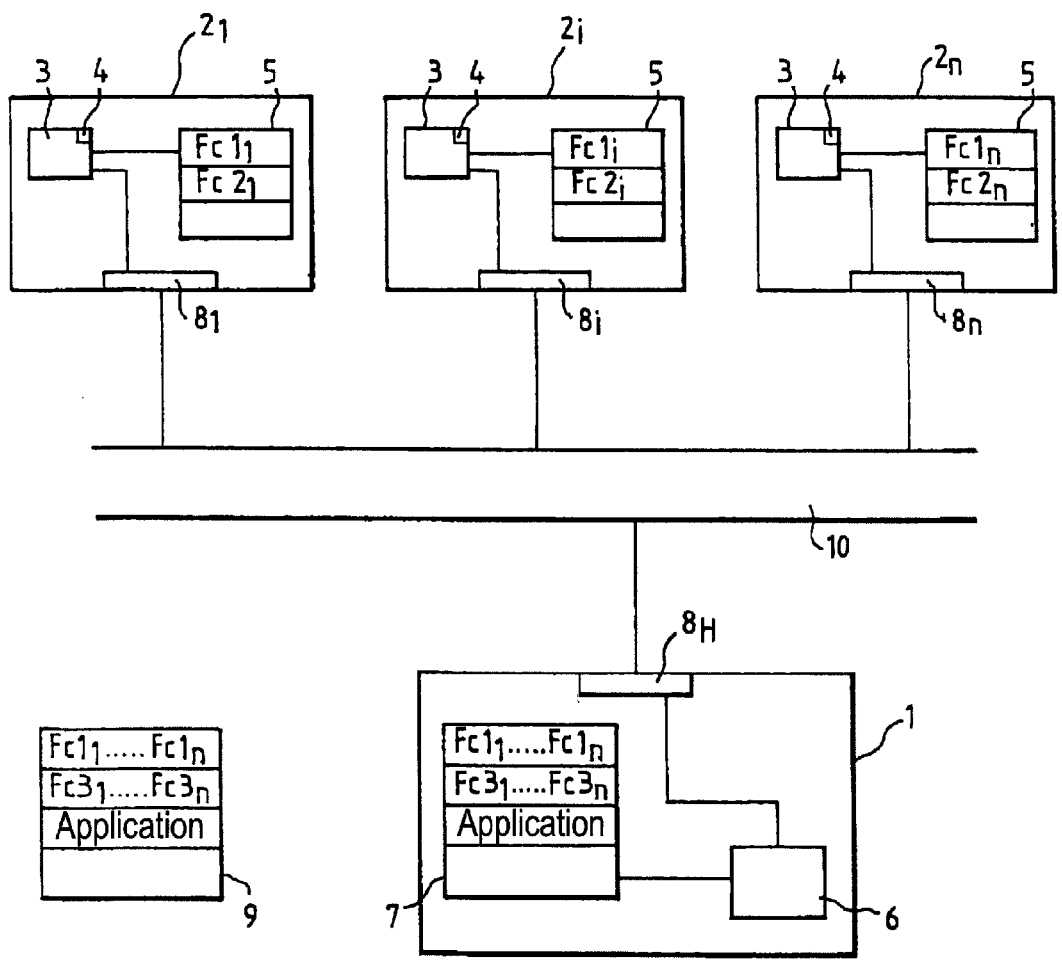
FIG. 1 schematically illustrates the basic components of a system according to the invention for secure transmission of a dataset and/or of a program.

In FIG. 1 can be seen the components of a system according to the invention for the secure transmission of a data set and/or of a program in a production lot of $HSM_i$ $2_1$, $2_i$, $2_n$. Each $HSM_i$ $2_1$, $2_i$, $2_n$ is provided with an HSM processor 3, an HSM memory 5 and means for the generation 4 of a variable code Cw. In each HSM memory 5, a first HSM-individual fixed code $Fc1_i$ and the second fixed code $Fc1_i$ are stored.

Furthermore, there is a host 1 with a host processor 6, a host memory 7 and usual interfaces $8_1$, $8_i$, $8_n$, $8_H$ for the connection of the HSM processors 3 to the host processor 6 by a BUS 10. In the host memory 7, the data set and/or the program (application), the first fixed code $Fc1_i$ and a third fixed code $Fc3_i$ are stored. These data were previously transported by means of a data carrier 9 to the host and stored therein.

The host processor 6 is provided for the delivery of an initialization data sequence to the HSM processor 3. The HSM processor 3 is provided for storing and delivering the generated variable code Cw to the host processor 6. The host processor 6 is further provided for the transformation of the received variable code Cw with the first fixed code $Fc1_i$ into a transformed variable code Cwt and for the return of the transformed variable code Cwt to the HSM processor 3. The HSM processor 3 is further provided for the back-transformation of the received transformed variable code Cwt with the first fixed code $Fc1_i$ into a transformed-back variable code $Cw_{rt}$ and its comparison with the stored variable code Cw and in case of agreement for the delivery of a confirmation data sequence to the host processor 6. The host processor 6 is further provided after reception of the confirmation data sequence for the coupling of the data set and/or of the program to be transmitted with the third fixed code $Fc3_i$ assigned to the $HSM_i$ $2_1$, $2_i$, $2_n$ and stored to a transmission data set and for the delivery of the transmission data set to the HSM processor 3. The HSM processor 3 is further provided for the determination of the second fixed code $Fc2_i$ by means of the stored given algorithm or for the readout from the HSM memory 5 and the comparison thereof with a second fixed code $Fc2_i$ calculated from the transmission data set. The HSM processor 3 is finally provided in case of agreement of the second fixed code $Fc2_i$ with the second fixed code $Fc2_i'$ for the authorization and approval of the data set and/or of the program for the activation in the $HSM_i$ $2_1$, $2_i$, $2_n$.

In the embodiment, the program is an application program. The first fixed code $Fc1_i$ is an authentication key $Authkey_i$. i is a serial number of the $HSM_i$ $2_1$, $2_i$, $2_n$ or an individual data set correlated therewith. The second fixed code $Fc2_i$ can be calculated from i, a hardware configuration parameter $HWP_i$, $Authkey_i$, a transport key $TK_i$ and optionally an additional fixed code portion with a defined algorithm.

The host 1 is a stand-alone host, arranged at the production site and has no security functionality.

Example 4

Final Production or Personalization at the Production Site

Figure 2A:
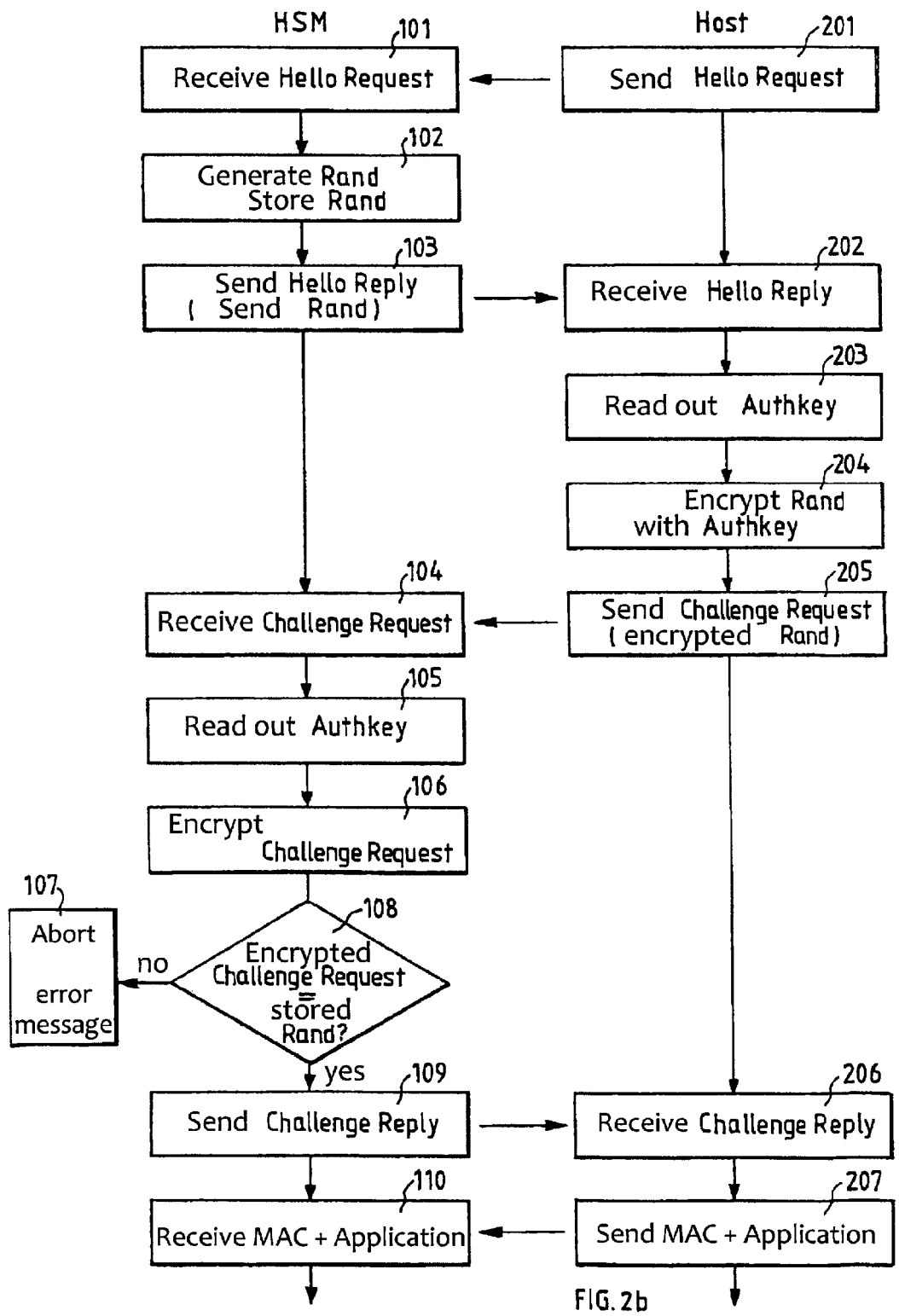
FIGS. 2a and 2b, in combination, are a flowchart for an embodiment of a method according to the invention for secure transmission of a dataset and/or of a program.
Figure 2B:
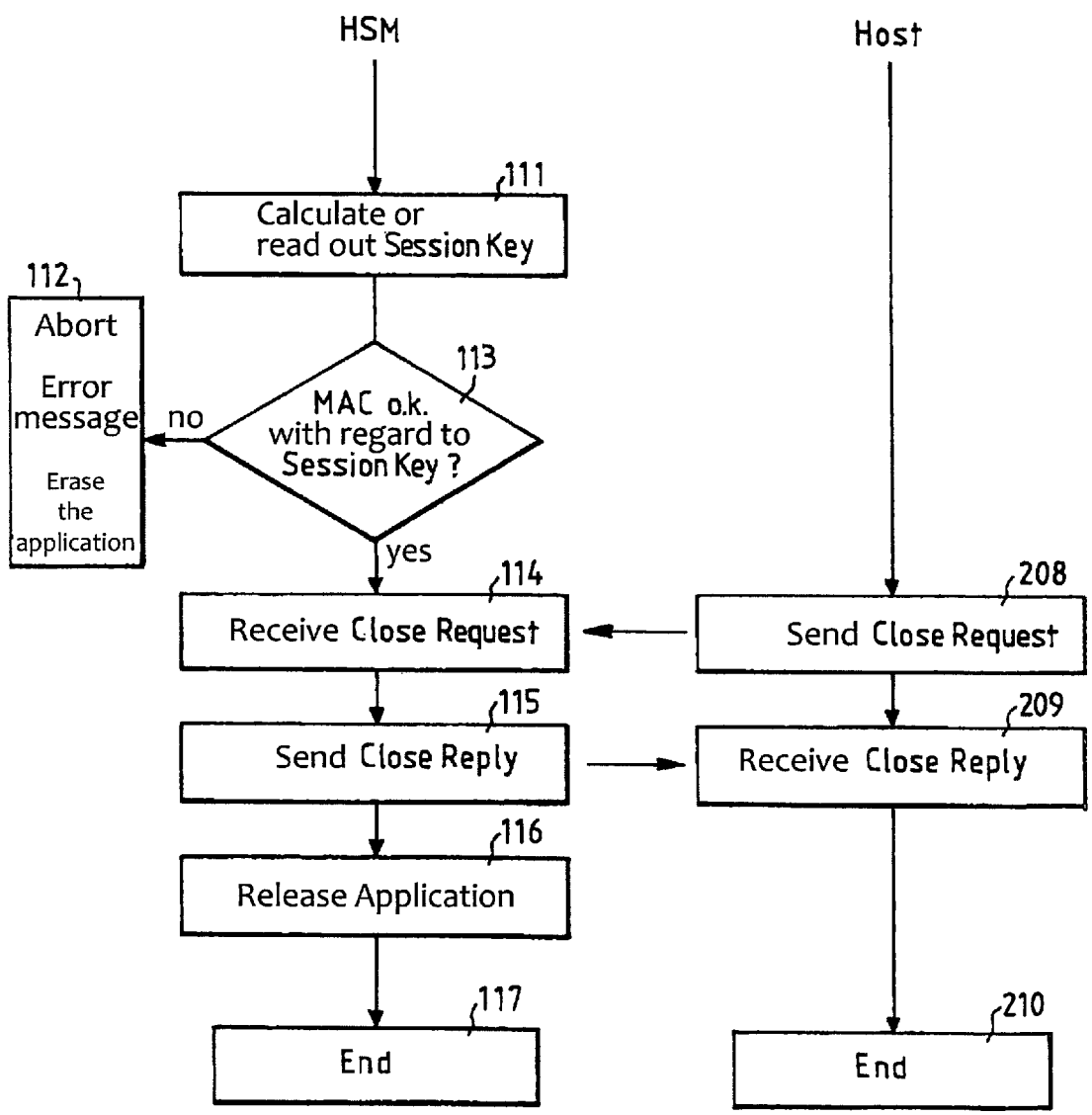

The system according to FIG. 1 is arranged at the production site, and the session protocol shown in FIG. 2 is carried out therewith. For this purpose, host 1 and $HSM_i$ $2_1$, $2_i$, $2_n$ are first connected by the BUS 10.

In FIG. 2, on the left side, steps of the process or of the method are shown, which are carried out by an HSM $2_1$, $2_i$, $2_n$, and on the right side, steps of the process or of the method are shown, which are carried out by the host 1. Arrows between the left side and the right side indicate a data transmission via the BUS 10.

In a first step 201, the host 1 generates and transmits a Hello Request. The HSM $2_1$, $2_i$, $2_n$ receives this Hello Request in step 101. This triggers in the HSM $2_1$, $2_i$, $2_n$ the generation of a random number (Rand) and the storage thereof in step 102. Then in step 103 the random number (Rand) is sent as a Hello Reply to the host 1. The host 1 receives the Hello Reply in step 202. This sets off step 203, in which the host 1 reads the Authkey ($Fc1_i$) from the host memory 7. Then the host processor 6 executes in step 204 an encryption of the random number (Rand) by means of the Authkey and transmits in step 205 the encrypted random number (Rand) to the HSM $2_1$, $2_i$, $2_n$ as a Challenge Request. The HSM $2_1$, $2_i$, $2_n$ receives the Challenge Request in step 104. In step 105 the Authkey ($Fc1_i$) is read from the HSM memory 5 and in step 106 a decryption of the Challenge Request is performed. In step 108 a comparison of the decrypted Challenge Request with the random number stored in the HSM $2_1$, $2_i$, $2_n$ takes place. In case of non-agreement step 107 follows, in which an abortion of the protocol and an error message are effected. In case of agreement, step 109 follows, in which a Challenge Reply is delivered from the HSM $2_1$, $2_i$, $2_n$ to the host 1. The host receives in step 206 the Challenge Reply and proceeds to step 207, in which an MAC (Fc$3_i$) and the application are read from the host memory 7 and combined to a transmission data set and delivered to the HSM $2_1$, $2_i$, $2_n$. The HSM $2_1$, $2_i$, $2_n$ receives the transmission data set in step 110, reads in step 111 the session key (Fc$2_i$) from the HSM memory 5 and verifies in step 113, whether MAC and session key are in agreement or are correlated with each other in a given manner. If not, step 112 follows, in which an abortion of the protocol, an error message and a deletion of the application from the memory 5 of the HSM $2_1$, $2_i$, $2_n$ take place. If yes, steps 114 and 115 or 208 and 209 follow, which represent a final routine for the communication between host 1 and HSM $2_1$, $2_i$, $2_n$. In step 116 finally is effected an approval or activation of the application in the HSM $2_1$, $2_i$, $2_n$, since it is authorized, and an end user can use the device, in which the HSM $2_1$, $2_i$, $2_n$ is integrated, in a usual way. Steps 117 and 210 are termination steps.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for the authenticated transmission of a data set and/or of a program from a host having a host processor to a hardware security module$_i$ (HSM$_i$) comprising the following steps:
   a) at a system manufacturer's site, for i HSM$_i$ each comprising an HSM processor, a code generator that generates a variable code Cw, and an HSM memory connected with the HSM processor, a first HSM-individual fixed code Fc$1_i$, a second HSM-individual fixed code Fc$2_i$, and a third HSM-individual fixed code Fc$3_i$ are determined,
      wherein the second fixed code Fc$2_i$ is calculated from the first fixed code Fc$2_i$ according to a given algorithm,
      wherein the third fixed code Fc$3_i$ is calculated from the second fixed code Fc$2_i$ and data of the data set and/or of the program, and
      wherein all the fixed codes Fc$1_i$, Fc$2_i$ and Fc$3_i$ optionally are different from each other,
   b) at the system manufacturer's site, the first fixed code Fc$1_i$ and the second fixed code Fc$2_i$ or the given algorithm are stored in the HSM memory;
   c) at least one of the HSM$_i$ is transported to a production site, and the first fixed code Fc$1_i$, and at least one of the data set and the program, and the third fixed code Fc$3_i$ are transmitted to the production site and stored at the host in a host memory, as host-stored data;
   d) at the production site, the HSM processor and the host processor are connected with each other by at least one interface;
   e) the host processor transmits to the HSM$_i$ an initialization data sequence, by means of which a response data sequence;
   f) after reception of the response data sequence, the host processor couples the data set and/or the program to be transmitted with the third fixed code Fc$3_i$ assigned to the HSM$_i$ and stored to a transmission data set and transmits the transmission data set to the HSM processor;

g1) the HSM processor calculates, by means of the stored given algorithm, the second fixed code Fc$2_i$ or reads it out from the HSM memory and compares it with a second fixed code Fc$2_i$' calculated from the transmission data set, or
   g2) the HSM processor calculates by means of the stored given algorithm the second fixed code Fc$2_i$ and therefrom in connection with the transmission data set or the transmitted data set and/or program the third fixed code Fc$3_i$ and compares it with the third fixed code Fc$3_i$' comprised in the transmission data set; and
   h) upon agreement of the second fixed code Fc$2_i$ with the second fixed code Fc$2_i$' or of the third fixed code Fc$3_i$ with the third fixed code Fc$3_i$', the authorization and approval of the data set and/or of the program for the activation in the HSM$_i$ are effected.

2. The method according to claim 1 comprising, immediately following step e):
   e1) the HSM$_i$ generates with the means for the generation of a variable code a variable code Cw, stores this variable code Cw in the HSM processor and transmits this variable code Cw via the interface to the host processor;
   e2) the host processor transforms the received variable code Cw by means of the first fixed code Fc$1_i$ stored and assigned to the HSM$_i$ into a transformed variable code Cw$_t$ and transmits the transformed variable code Cw$_t$ to the HSM processor, and
   e3) the HSM processor carries out with the received transformed variable code Cw$_t$ with the first fixed code Fc$1_i$ a symmetric transformation being reverse to the transformation of the step e2) and compares the obtained back-transformed variable code Cw$_{rt}$ with the variable code Cw stored in step e1) and transmits in case of agreement a confirmation data sequence to the host processor.

3. The method according to claim 1 comprising a key code as said data set.

4. The method according to claim 1 comprising employing a boot loader program or an application program as said program.

5. The method according to claim 1 comprising using the first fixed code Fc$1_i$, an authentication key Authkey$_i$.

6. The method according to claim 1 comprising selecting i from the group consisting of a serial number of the HSM$_i$ or an individual data set correlated therewith.

7. The method according to claim 1 comprising calculating the second fixed code Fc$2_i$ from i, a hardware configuration parameter HWP$_i$, Authkey$_i$, a transport key TK$_i$ and, optionally an additional fixed code portion with a defined algorithm.

8. The method according to claim 1 comprising before the step a), producing at least one HSM$_i$ by an HSM manufacturer, and assigning, by the HSM manufacturer, at least i and the first fixed code Fc$1_i$ to the HSM$_i$.

9. The method according to claim 7 comprising, by the HSM manufacturer, storing the HWP$_i$ in the HSM$_i$ and transmitting Authkey$_i$ and TK$_i$ to the system manufacturer.

10. The method according to claim 1 comprising providing the host at the HSM manufacturer or at the system manufacturer.

11. The method according to claim 1 comprising transmitting the data set and/or the program before step f) from an application server to the host.

12. The method according to claim 1 comprising operating the host as a stand-alone host with no security functionality.

13. A method as claimed in claim 1 comprising including an identification of the HSM$_i$ in said response data sequence in step (e), and, in step (f), coupling the host-stored data to the transmission data set after reception of said response sequence and successful identification of the $HSM_i$.

14. A system for the secure transmission of a data set and/or of a program into an $HSM_i$ comprising:

comprising at least one $HSM_i$ with an HSM processor, an HSM memory and a code generator that generates a variable code Cw, said HSM memory storing therein a first HSM-individual fixed code $Fc1i$ and a given algorithm for the calculation of a second HSM-individual fixed code $Fc2i$ from the first fixed code $Fc1_i$ or the second fixed code $Fc2_i$;

a host with a host processor, a host memory and an interface for connection of the HSM processor to the host, the host memory storing therein the data set and/or the program, the first fixed code $Fc1_i$ and a third fixed code $Fc3_i$;

the host processor delivering an initialization data sequence to the HSM processor, which effects an identification of the $HSM_i$;

wherein the HSM processor stores and delivers the generated variable code Cw to the host processor, and the host processor transforms the received variable code Cw with the first fixed code $Fc1_i$ into a transformed variable code $Cw_t$ and returns the transformed variable code $Cw_t$ to the HSM processor, and wherein the HSM processor back-transforms the received transformed variable code $Cw_t$ with the first fixed code $Fc1_i$ into a transformed-back variable code $Cw_{rt}$ and compares the transformed-back variable code $Cw_{rt}$ with the stored variable code Cw and upon agreement, delivers a confirmation data sequence to the host processor;

the host processor, after the identification of the $HSM_i$ or reception of the confirmation data sequence, links the data set and/or of the program to be transmitted with the third fixed code $Fc3_i$ assigned to the $HSM_i$ and stored as a transmission data set and transmits the transmission data set to the HSM processor;

the HSM processor either calculating the second fixed code $Fc2_i$ using the stored given algorithm or reading the second fixed code $Fc2_i$ from the HSM memory, and comparing the second fixed code $Fc2_i$ with a second fixed code $Fc2_i'$ calculated from the transmission data set, or calculating the second fixed code $Fc2_i$ using the stored given algorithm in connection with the transmission data set or the transmitted data set and/or program for calculating the third fixed code $Fc3_i$ and the comparison thereof with the third fixed code $Fc3_i'$ comprised in the transmission data set; and the HSM processor upon agreement of the second fixed code $Fc2_i$ with the second fixed code $Fc2_i'$ or of the third fixed code $Fc3_i$ with the third fixed code $Fc3_i'$ authorizing and approving the data set and/or of the program for activation in the $HSM_i$.

15. The system according to claim 14, wherein the data set is a key code.

16. The system according to claim 14, wherein the program is a boot loader program or an application program.

17. The system according to claim 14, wherein the first fixed code $Fc1_i$ is an authentication key $Authkey_i$.

18. The system according to claim 14, wherein i is a serial number of the $HSM_i$ or an individual data set correlated therewith.

19. The system according to claim 14, wherein the second fixed code $Fc2_i$ is calculated from i, a hardware configuration parameter $HWP_i$, $Authkey_i$, and a transport key $TK_i$ and optionally an additional fixed code portion with a defined algorithm.

20. The system according claim 14, wherein the host is a stand-alone host and has no security functionality.

21. A processor assembly comprising:

at least one $HSM_i$ with an HSM processor, an HSM memory and a code generator that generates a variable code Cw, wherein in the HSM memory a first HSM-individual fixed code $Fc1_i$ and a given algorithm for the calculation of a second HSM-individual fixed codes $Fc2_i$ from the first fixed code $Fc1_i$ or the second fixed code $Fc2_i$ are stored, wherein the HSM processor is provided for the storage and delivery of the generated variable code Cw to the host processor, wherein the HSM processor is provided for the back-transformation of the received transformed variable code $Cw_t$ with the first fixed code $Fc1_i$ into a transformed-back variable code $Cw_{rt}$ and the comparison thereof with the stored variable code Cw and in case of agreement for the delivery of a confirmation data sequence to the host processor, wherein the HSM processor is provided either for the calculation of the second fixed code $Fc2_i$ by means of the stored given algorithm or for the readout thereof from the HSM memory and for the comparison thereof with a second fixed code $Fc2_i'$ calculated from the transmission data set or for the calculation of the second fixed code $Fc2_i$ by means of the stored given algorithm and therefrom in connection with the transmission data set or the transmitted data set and/or program for the calculation of the third fixed code $Fc3_i$ and the comparison thereof with the third fixed code $Fc3_i'$ comprised in the transmission data set, and wherein the HSM processor in case of agreement of the second fixed code $Fc2_i$ with the second fixed code $Fc2_i'$ or of the third fixed code $Fc3_i$ with the second fixed code $Fci_i'$ for the authorization and approval of the data set and/or of the program for the activation in the $HSM_i$; and the first fixed code $Fc1_i$, the third fixed code $Fc3_i$ and/or the data set or the application program being stored together on a data carrier or combined to an information unit or stored on different data carriers or arranged in different information units.

* * * * *